July 25, 1933. H. HARGREAVES 1,920,078
MOTOR VEHICLE BRAKE
Filed Sept. 8, 1931
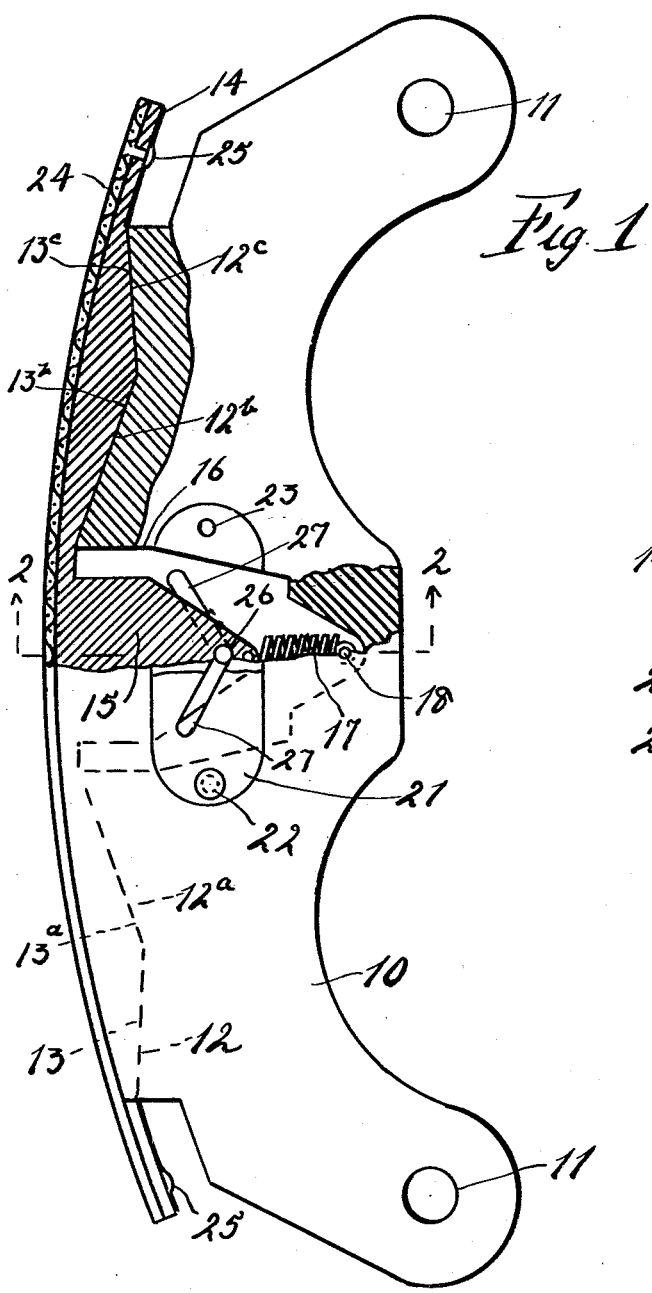
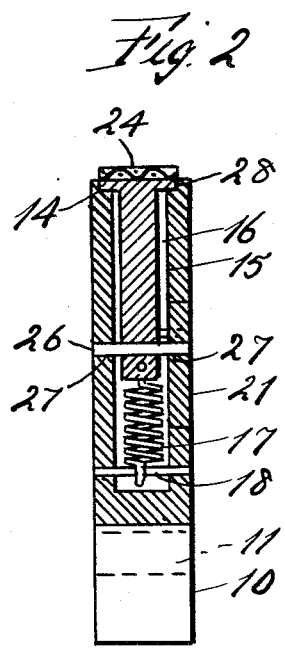
INVENTOR
Herbert Hargreaves
By W. W. Williamson
Atty.

Patented July 25, 1933

1,920,078

UNITED STATES PATENT OFFICE

HERBERT HARGREAVES, OF PHILADELPHIA, PENNSYLVANIA, ASSIGNOR TO JOHN WARREN WATSON, OF PHILADELPHIA, PENNSYLVANIA

MOTOR VEHICLE BRAKE

Application filed September 8, 1931. Serial No. 561,529.

My invention relates to new and useful improvements in a motor vehicle brake and has for its object to provide for applying the brake under a multiple power sliding system for the purpose of increasing the grip of the brake in exact ratio with the power necessary to stop the vehicle.

A further object of my invention is to so construct such a brake that when initially applied with but little physical effort, it will thereafter develop the grip necessary to stop the vehicle.

A still further object of my invention is to construct such a brake so that its operations will be simple and effective and it will be cheap to manufacture.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a side view of a brake partly broken away and sectioned to show the construction of my improvements.

Fig. 2 is a section on the line 2—2 of Fig. 1, looking in the direction of the arrows.

In carrying out my invention as herein embodied, 10 represents the seat of a motor vehicle brake shoe having the usual holes 11 for attachment to the standard mechanism for operating the brake and this seat has formed thereon the inclined surfaces 12, 12a, 12b and 12c against which the inclined surfaces 13, 13a, 13b and 13c of the brake shoe 14 are adapted to bear for the purpose hereinafter set forth.

15 represents a lug or off-set formed with the brake shoe and extending into the cavity 16 of the seat 10 and to the inner end of this lug is attached one end of the coil spring 17 while the other end of said spring is attached to the pin 18, the action of this spring being to normally hold the inclined surfaces 13, 13a, 13b, and 13c in contact with the inclined surfaces 12, 12a, 12b and 12c of seat 10, thereby maintaining the inclined surfaces in their proper relative positions, as will be readily understood.

21 represents a plate for closing a suitable opening in the side of the seat 10 for gaining access to the spring so as to readily assemble or dismember the device and this plate is held in place by the fastening devices 22 such as screws or rivets passed through the holes 23.

In practice, the outer surface of the brake shoe is provided with a liner 24 of metal or other suitable material secured in place by the rivets 25 in order that the surface which is utilized for effecting the braking operations may be removed and replaced when unduly worn thereby avoiding injury to the brake shoe.

From the foregoing description, the operation of my improvement will be as follows:—

Upon the initial application of the brake which may be accomplished with a very small amount of manual labor, it being only necessary to bring the surface of the liner in contact with the concave braking surface of the brake drum, the brake shoe will be moved in the direction of the travel of the wheel to which it is applied, thereby causing the inclined surfaces 13a and 13c to ride up the inclined surfaces 12a and 12c or the inclined surfaces 13 and 13b to ride up the inclined surfaces 12 and 12b depending upon the direction in which the wheel is revolving. The grip between the brake shoe and the drum will be varied in proportion to the speed of revolution of the drum or to the degree of the load exerted upon the shoe in slowing down or stopping the vehicle.

When the brake applying mechanism is released, the seat 10 will be moved inward, thus withdrawing the outer surface of the liner 24 out of contact with the brake drum and when this has been accomplished, the spring 17 by its pull upon the lug 15 will restore the brake shoe to its normal position upon its seat, as shown in Fig. 1.

To prevent the brake shoe from becoming entirely detached from its seat should the spring 17 be disconnected or broken, I provide a pin 26 which is secured in the inner end of the lug 15, its ends projecting outward into the slots 27, said slots being properly inclined to permit the pin to follow the movements of the brake shoe in traveling up the inclines; it being understood that the brake shoe can move in either direction. In order that the brake shoe may be properly held against sidewise displacement, a channel 28 is formed in the seat in which the shoe fits so as to have a free sliding movement therein.

My improved brake provides a cheap, simple and effective means for automatically applying the necessary grip between the shoe and drum of a vehicle brake without undue manual effort on the part of the operator, thereby reducing the likelihood of accidents which often involve the loss of life.

The construction of a brake in accordance with this invention provides an automatically adjustable braking element since the movements of the shoe relative to its seat will compensate for wear on the liner 24 or any lost motion between the operating parts.

Of course I do not wish to be limited to the exact details of construction as herein shown, as these may be varied within the limits of the appended claims without departing from the spirit of my invention.

Having thus fully described my invention, what I claim as new and useful is:—

1. In a brake mechanism, a brake shoe and a shoe seat each having inclined complimentary surfaces thereon arranged to slidably bear against each other with relative movement of the shoe with respect to the seat when a braking force is applied to the seat, and means for returning the shoe to its normal position with respect to the seat when the braking force is released.

2. In a brake mechanism, a brake shoe and a shoe seat each having inclined complimentary surfaces thereon arranged to slidably bear against each other with relative movement of the shoe with respect to the seat when a braking force is applied to the seat, means for returning the shoe to its normal position with respect to the seat when the braking force is released, and means preventing detachment of said brake shoe from the seat.

3. In a brake mechanism, a brake shoe and a seat therefor each having inclined complimentary surfaces thereon arranged to slidably bear against each other with relative movement of said shoe with respect to the seat when a braking force is applied to the latter, a projection on said shoe and extending inwardly of the seat in a cavity formed therein, and means connected between the projection and the seat to return the shoe to its normal position on release of the braking force.

4. In a brake mechanism, a brake shoe and a shoe seat each having inclined complimentary surfaces thereon arranged to slidably bear against each other with relative movement of the shoe with respect to the seat when a braking force is applied to the seat, a spring for returning the shoe to its normal position with respect to the seat when the braking force is released, and means preventing detachment of said brake shoe from the seat.

5. In a brake mechanism, a brake shoe and a shoe seat each having inclined complimentary surfaces thereon arranged to slidably bear against each other with relative movement of the shoe with respect to the seat when a braking force is applied to the seat, means for returning the shoe to its normal position with respect to the seat when the braking force is released, means preventing detachment of said brake shoe from the seat, and means formed in the face of the seat and engaged by the shoe to prevent sidewise displacement of the shoe with respect to the seat.

6. In a brake mechanism, a brake shoe and a shoe seat each having inclined complimentary surfaces thereon arranged to slidably bear against each other with relative movement of the shoe with respect to the seat when a braking force is applied to the seat, means for returning the shoe to its normal position with respect to the seat when the braking force is released, and means engaging the shoe and extending into upwardly inclined slots formed in the seat to allow said means to follow the movement of the shoe on said inclines and prevent detachment of the shoe from the seat.

7. In a brake mechanism, a brake shoe and a seat therefor each having inclined complimentary surfaces thereon arranged to slidably bear against each other with relative movement of said shoe with respect to the seat when a braking force is applied to the latter, a projection on said shoe and extending inwardly of the seat in a cavity formed therein, and means engaging the shoe and extending into upwardly inclined slots formed in the seat to allow said means to follow the movement of the shoe on said inclines and prevent detachment of the shoe from the seat.

8. In a brake mechanism, a shoe seat having a cavity therein, inclined slots projecting outwardly from said cavity, and an opening in one wall thereof to permit access to said cavity, a closure for said opening, a brake shoe bearing against the seat, a projection formed on said seat and extending inwardly of the cavity, and means engaging the shoe and extending into upwardly inclined slots formed in the seat to allow said means to follow the movement of the shoe on said inclines and prevent detachment of the shoe from the seat.

9. In a brake mechanism, a shoe seat having a cavity therein, inclined slots projecting outwardly from said cavity, and an opening in one wall thereof to permit access to said cavity, a closure for said opening, a brake shoe bearing against the seat, a projection formed on said seat and extending inwardly of the cavity, and means connected between the projection and the seat, tending to maintain the brake shoe snugly against the face of the seat.

10. In a brake mechanism, a shoe seat having a cavity therein, a brake shoe bearing against the seat, a projection formed on said shoe and extending inwardly of the cavity, and a series of inclined surfaces formed upon the seat and shoe respectively, causing said shoe to move outward relative to said seat when moved lengthwise thereon.

HERBERT HARGREAVES.